United States Patent [19]

Vassileff

[11] Patent Number: 4,724,242

[45] Date of Patent: * Feb. 9, 1988

[54] OPEN CELL FOAMED GYPSUM ABSORBENTS

[76] Inventor: Neiko Vassileff, 1440 Midland Ave., Bronxville, N.Y. 10701

[*] Notice: The portion of the term of this patent subsequent to Sep. 16, 2003 has been disclaimed.

[21] Appl. No.: 907,000

[22] Filed: Sep. 12, 1986

Related U.S. Application Data

[63] Continuation-in-part of Ser. No. 715,118, Mar. 22, 1985, Pat. No. 4,612,333.

[51] Int. Cl.$^4$ ............................................. C08G 18/14
[52] U.S. Cl. ................................................... 521/83; 55/97; 55/98; 55/387; 55/DIG. 12; 106/86; 106/87; 106/88; 106/109; 210/188; 210/500.27; 210/500.38; 210/502.1; 521/100; 604/358; 604/365; 604/366; 604/369
[58] Field of Search ................ 521/83, 100; 106/86, 106/87, 88, 109, 111; 131/331, 332, 334, 335, 349; 55/97, 98, 387, DIG. 13, DIG. 42; 210/188, 500.27, 500.38, 502.1, 510.1; 604/358, 365, 366, 369

[56] References Cited

U.S. PATENT DOCUMENTS

| | | | |
|---|---|---|---|
| 2,902,998 | 9/1959 | Durandeaux | 131/331 |
| 3,526,685 | 9/1970 | Foster et al. | 106/87 |
| 3,563,777 | 2/1971 | Prath et al. | 106/88 |
| 3,719,513 | 3/1973 | Bragg et al. | 106/109 |
| 3,758,319 | 9/1973 | Ergene | 106/88 |
| 3,839,059 | 10/1974 | Rothfelder et al. | 106/109 |
| 3,926,650 | 12/1975 | Lange et al. | 106/88 |
| 3,974,024 | 8/1976 | Yano et al. | 106/88 |
| 4,084,980 | 4/1978 | Motoki | 106/87 |
| 4,133,638 | 1/1979 | Healey | 422/32 |
| 4,229,223 | 10/1980 | Flake | 106/88 |
| 4,240,839 | 12/1980 | Crepeau et al. | 106/88 |
| 4,265,964 | 5/1981 | Burkhart | 521/83 |

*Primary Examiner*—Maurice J. Welsh
*Attorney, Agent, or Firm*—Lackenbach Siegel Marzullo & Aronson

[57] ABSTRACT

An open-cell, foamed gypsum absorbent for fluids is prepared by foaming a slurry containing plaster, carbonaceous material, and a weak acid. Some of the preferred carbonaceous material include activated carbon, dried blood, comminuted vegetable matter containing chlorophyll, hemoglobin containing heme, and organometallic chelates. Aluminum sulfate is the preferred weak acid.

Some of the gases absorbed are carbon monoxide, carbon dioxide, sulfur dioxide, ammonia, formaldehyde, nitrogen oxides, and tobacco smoke.

Some of the liquids absorbed are water, salt water, urine, blood, sperm, catemenial exudate, and perspiration.

This invention has applications in cigarette filters, gas masks, diapers, wound dressings, hospital or surgical sheeting, and undergarments for incontinent adults.

27 Claims, No Drawings

OPEN CELL FOAMED GYPSUM ABSORBENTS

PREVIOUS PROSECUTION

This application is a continuation-in-part of Ser. No. 715,118 filed Mar. 22, 1985 now U.S. Pat. No. 4,612,333, issued Sept. 16, 1986.

FIELD OF THE INVENTION

This invention relates to absorbents for liquid fluids such as water, urine, blood, catemenial discharges, and other discharges. In this aspect the invention may be applied to diapers, surgical bed linen, hospital garments, sanitary napkins, clothes for incontinent adults, tampons, and related hygenic, hospital, or surgical applications dealing with liquids.

This invention also relates to absorbents for gaseous fluids and vapors such as carbon monoxide, ozone, carbon dioxide, sulfur dioxide, nitrogen oxides alone or mixed (so-called $NO_x$), ammonia, formaldehyde, tobacco smoke, and other noxious or unpleasant vapors. In this aspect the invention may be applied to gas masks, cigarette filters, household air absorbents, and other related applications dealing with gases.

BACKGROUND AND DISCUSSION OF THE PRIOR ART

In the past gypsum and foamed gypsum have been applied to the construction and insulation industries as disclosed in the following U.S. Patents among others:

| Applicant | U.S. Pat. No. |
| --- | --- |
| Motoki | 4,084,980 |
| Healy | 4,133,638 |
| Mulvey et al. | 4,161,855 |
| Flake | 4,229,223 |
| Crepeau et al. | 4,240,839 |
| Burkhart | 4,265,964 |

For absorbing liquids in the past, the usual materials used have been cellulosic fibers and cellulosic derivatives, as well as natural fibers such as cotton. These are expensive. Also in the form of fibers they tend to mat or clump; thus changing the shape of whatever construction they form.

In the gaseous filter field, such as gas masks, absorbents have been usually exotic and expensive, such as Hopcolite, which is a mixture of silver permaganate, copper oxide, and nickel oxide.

The present invention provides an effective, nonflammable inert, non-settling lightweight, non-dusting, and inexpensive medium for absorbing fluids.

It is an object of the present invention to provide a novel absorbent for water and aqueous fluids for use in diapers, catemenial devices, hospital garments, wound dressings, geriatric underclothing, surgical linen and the like.

It is another object of the present invention to provide a novel absorbent for gaseous fluids such as ammonia, tobacco smoke, and oxygenated gases such as carbon monoxide, sulfur dioxide, ozone, nitrogen oxides and formaldehyde.

It is still a further object of the present invention to provide an absorbent for devices which aid the human lungs by providing clean air, as in gas masks, room filters, aircraft filters, air conditioning filters, cigarette filters, and the like.

SUMMARY OF THE INVENTION

The novel absorbent comprises open-cell, foamed gypsum and a carbonaceous material such as dried blood, activated carbon, comminuted vegetable matter containing chlorophyll, sucrose, chelates including hemoglobin and an unsaturated vegetable oil such as tung oil or linseed oil. The foaming step is carried out in the presence of a surface-active agent, a polymeric softener, and a Lewis acid. The preferred surface-active agent is TRITON X-100 (Rohm & Haas, Phila. Penna). The preferred water-soluble polymer is sodium polyacrylate. The preferred Lewis acid is aluminum sulfate. Aluminum sulfate (alum) may also play a role as an absorbent as well as an acid.

The starting material for the final foamed gypsum, calcium sulfate with two water molecules of hydration per molecule, is a plaster or plaster cement with one-half molecule water of hydration per molecule of calcium sulfate.

The carbonaceous, open-cell, foamed gypsum of the present invention absorbs many noxious or dangerous gaseous fluids such as carbon monoxide, sulfur dioxide, ozone, ammonia, nitrogen oxides, and formaldehyde. The open-cell foamed gypsum, made from plaster and containing carbonaceous material absorbs liquid fluids such as water, urine, sperm, blood, perspiration, and other human exudates, particularly aqueous ones.

DESCRIPTION OF THE PREFERRED EMBODIMENTS

The present invention is prepared by mixing two or three combinations of components. The two or three combinations may be mixed sequentially in separate steps or simultaneously. The preferred mode for mixing simultaneously is by a pressurized mixing "gun" with two or three hoses for the two or three streams of components leading to a continuous mixer, which is often held in a workman's hand.

The first combination of components is called the slurry. It comprises plaster, a flexibilizing water-soluble polymer such as sodium polyacrylate, the carbonaceous material, and water.

The second combination of components is called the foamer. It comprises water, a detergent or surface-active agent, a Lewis acid, often alum, and air or another gas.

The optional third stream is a polymeric foam strengthener such as polyurethane or a polymeric latex such as standard GR-S rubber (a copolymer of butadiene and styrene).

Optionally a surface active agent may be in the slurry mix. Also a carbonaceous material may be in the foamer. If a polymeric material such as molasses is employed in the foamer, it may also serve as a carbonaceous material or flexibilizing agent for the slurry. Since one method of combining the components is to do so simultaneously, obviously it is arbitrary to specify that any one component should be in any particular stream.

The fundamental component of the present invention is the hemihydrate plaster, often termed plaster of Paris. Some grades of plaster are called moulding plaster, casting plaster, pottery plaster, or gauging plaster. Sometimes fibrous or polymer material is included, and the material is then termed industrial plaster. All types of plaster may be used in the present invention, even expensive dental plaster. Plaster is characterized by a rather high water demand of 60–70 parts water per part plaster resulting in a minimum dry compression strength of about 1800 to about 2400 psi.

In place of or long with plaster one may employ a gypsum cement. Gypsum cements are generally more hydrated than plasters, hence have a lower water demand of about 30 to 45 parts water to part gypsum cement.

White Art plaster or No. 1 Casting plaster from U.S. Gypsum Co., Chicago, Ill. 60606 is the preferred plaster to practice the instant invention.

The absorbing specificity of the foamed gypsum of the present invention, particularly for gaseous fluids, is thought to be due to the carbonaceous material, preferably containing a natural chelating agent or with a synthetic chelating agent added to the mix. Preferred carbonaceous material containing natural chelating agents are dried blood containing heme or hemoglobin and comminuted vegetable matter containing chlorophyll. Preferred carbonaceous material not containing chelating agents is activated carbon, which is commercially available in dozens of types and grades. Sugars, such as sucrose, may also be used as a carbonaceous material. Some of the synthetic chelating agents which may optionally be added to the slurry or the foamer are: ethylenediaminetetraacetate (EDTA), nitrilotriacetic acid (NTA), disodium ethanoldiglycine, sodium diethanolglycine, hydroxyethylenediaminetriacetate, and the like alone or in mixtures. Heavy metal salts of synthetic chelating agents may also be employed.

Dried blood alone or in combination with activated carbon is especially preferred. The carbonaceous material with or without added chelating agents is preferable in the form of a fine powder, e.g. from about −50 to about −300 mesh.

A water-soluble polymer is employed in the slurry, the slurry stream to a continuous mixing gun, or the final mixed foam as a flexibilizing agent. A flexibilizing agent helps prevent the final foamed gypsum absorbent from being too brittle or frangible. Any water-soluble polymer such as carboxymethylcellulose, polyacrylamide, polyvinyl alcohol, methylcellulose, neutralized polyacidic acid, or hydrolyzed polyacrylonitrile, which is a mixed copolymer of two-thirds acrylate and one-third amide groups. Amongst the water-soluble polymers, sodium polyacrylate is preferred. Natural polymers such as molasses may also be employed.

A surface-active agent may be added to the foamer, or even the slurry, in order to help form the foam, when air, nitrogen, argon, a light halocarbon, or any other gas is used to make the slurry/foamer mixture foam. This normally requires only a few seconds, but up to five to ten minutes of foaming may be employed. Cationic, anionic, or nonionic surface-active agents may be used; nonionic detergents are preferred. Particularly preferred is Triton X-100 alkaryl polyether alcohol surface-active agent.

Optionally, the foamed slurry may be hardened and strengthened by means of an added polymer or a polymer formed in situ. A wide range of polymeric latices are excellent added polymers. These include natural rubber latex, synthetic rubber latex of the butadiene/styrene type or the butadiene/styrene/acrylonitrile type, poly(vinyl chloride) latex, acrylic latex, or polystyrene latex. Adhesive-type latices such as poly(vinyl acetate) may also be employed. For the in situ type a polyurethane, made in place by adding a polyol to a diisocyanate in the presence of a weak acid is preferred.

Lewis acids are added for several reasons not all of which are well understood. A Lewis acid may catalyze formation of the foam hardening polymer, especially when it is polyurethane. A Lewis acid may improve the sorption on the surface of the plaster and change the pH of the water-soluble polymer and the chelating agent. Aluminum sulfate, especially in the many forms, hydrations, and compositions generically called "alum" is the preferred Lewis acid because it has a specific sorption for ammonia, formaldehyde, and perhaps other toxins.

When the foamed gypsum absorbent of the instant invention is made in sequential steps the following procedure and components are typical for the hardened type:

1. The slurry is mixed for 1–5 minutes containing:

|  | Parts By Weight |
| --- | --- |
| dry plaster | 50 |
| activated carbon | 25 |
| spray-dried blood | 25 |
| water-soluble polymer | 0.5 |
| nonionic surface-active agent | 5 |
| water | 70 |

2. The mixed slurry is foamed with compressed air for 2–4 minutes and a foam hardener is added comprising:

|  | Parts By Weight |
| --- | --- |
| diisocyanate | 50 |
| a polyol | 50 |
| a Lewis acid | 5 |

3. After 5–10 minutes of added mixing and foaming the foam is poured into a large cup (usually cardboard) or a large pan (usually metal) and placed under a heating lamp for 10–15 minutes to make a raised "bun". The bun is then placed in an oven at about 90° C. for about 30–45 minutes to volatilize excess water.

When a foamed gypsum absorbent of the non-hardened type is made the following procedure is typical:

1. The slurry is mixed until smooth:

|  | Parts By Weight |
| --- | --- |
| dry plaster | 100 |
| comminuted vegetable matter containing chlorophyll | 100 |
| water-soluble polymer | 1 |
| water | 125 |

2. A foaming system is made from:

|  | Parts By Weight |
| --- | --- |
| water | 150 |
| surface-active agent | 10 |
| Lewis acid e.g. alum | 15 |

3. Optionally poly(vinyl acetate) latex about 25 parts is added to the slurry or the foaming system. Optionally a diisocyanate is added to the slurry and a polyol added to the foaming system (about 50 parts each). The combinations are mixed and air or nitrogen is introduced for 1–3 minutes, whereupon the foam is processed and dried; as above.

When a simultaneous system is employed, a large hopper of dry mix containing plaster and carbonaceous material is prepared. A tank of foamer containing water, surface-active agent, water-soluble polymer and Lewis acid is prepared. A cylinder of compressed air or nitrogen is attached to the mixer "gun" by one hose; a slurry of the dry mix from a drum is attached by another hose to the mixer "gun"; the third hose contains the foamer. The hoses are about 1–2 cm. in diameter. The feed rates and gas pressure are so adjusted so that a steady stream of foamed gypsum can be "shot" into containers to make about five-liter cylindrical "buns" or about 10-liter pans of foam. With this simultaneous process either no hardening polymer is employed or only a latex, not a polyurethane in situ polymer is normally employed.

Having described above the preferred embodiments of the present improvement invention broadly. I now illustrate my invention with specific Examples which do not limit the scope of this invention. Many other illustrative Examples could be given, still within the purview of my disclosure.

The Examples and disclosure of the parent case are hereby incorporated by reference, attached hereto and forming a part hereof as A-2 to A-18.

EXAMPLE 1

This example illustrates making an absorbent particularly useful for diapers, undergarments for the incontinent and the like, because this absorbent is especially selective for ammoniacal compounds.

The slurry consists of:
500 parts HYDROCAL white gypsum cement (U.S. Gypsum Co., Chicago, Ill. 60606)
5 parts sodium polyacrylate
100 parts sucrose
500 parts water.

This slurry was stirred for 1 to 5 minutes until it was smooth.

The foamer solution consists of:
500 parts water
25 parts nonionic surface-active agent TRITON X-100, (Rohm & Hass, Phila. Penna.).
250 parts aluminum sulfate, as weak acid.

The foamer was mixed with the slurry for 1–3 minutes. Then compressed air was introduced at 0.2 to 1 atmospheres pressure for about 2–4 minutes and then poured into large baking pans. The pans were first heated for about 10 to 15 minutes at about 50° C. and then heated in an oven for about one hour at about 90° C. until dry. The foamed "bun" was then broken up into small particles especially suited for use in garments subjected to urine.

EXAMPLE 2

This Example illustrates the preparation of an absorbent which has general utility for fluids and is particularly useful for absorbing ozone.

The slurry comprised:
500 parts HYDROCAL white gypsum cement
250 parts dried blood
100 parts sucrose
5 parts sodium polyacrylate
500 parts water.
This slurry was stirred for 1–5 minutes until it was smooth.

The foamer solution comprised:
500 parts water
25 parts TRITON X-100 nonionic surface active agent
250 parts aluminum sulfate, as weak acid.

The foamer was mixed thoroughly with the slurry for about 1–3 minutes. Then compressed air was introduced at 0.2 to 1 atmosphere pressure for about 2–4 minutes and then poured into large baking pans. The pans were first heated for about 10–15 minutes at about 50° C. and then heated in an oven for about one hour at about 90° C. until dry. The foamed "bun" was then cut to small pieces of the appropriate shape for use.

EXAMPLE 3

This Example illustrates the preparation of an absorbent which has general utility for fluids, including ozone, and is particularly useful for absorbing carbon monoxide.

The slurry comprised:
1100 parts moudling (casting) plaster
500 parts activated carbon
500 parts dried blood
500 parts polyunsaturated oil (tung or linseed)
5 parts sodium polyacrylate
20 parts nonionic surface-active agent
1200 parts water.

This slurry was mixed for 2–5 minutes until it was smooth.

The foamer solution comprised:
400 parts water
200 parts aluminum sulfate Lewis acid
20 parts nonionic surface-active agent.

After thorough mixing of the foamer with the slurry, compressed air was introduced at a pressure of about 0.5 atmospheres for about three minutes and the fluid foam poured into large pans. Water was first eliminated by heating for about 15 minutes at about 50° C. and then for about one hour at about 90° C. until dry. The foamed gypsum "bun" was then broken up to small pieces for use.

EXAMPLE 4

This Example illustrates the use of a crosslinked water-sensitive polymer to make an absorbent which will swell to a gel upon exposure to liquids. This foamed gypsum which swells and gels is particularly suitable for use in diapers and the like.

The slurry contained:
100 parts moulding (casting) plaster
50 parts hemoglobin
100 parts water
10 parts sodium polyacrylate
20 parts Carbopol brand (B.F. Goodrich, Akron, Ohio) sodium polyacrylate-poly (allyl sucrose) copolymer.

This slurry was stirred until it was uniformly smooth, which was about 5–7 minutes.

The foaming mix contained:
100 parts water
10 parts nonionic surface-active agent
20 parts aluminum sulfate Lewis acid.

After thorough mixing of the foaming mix with the slurry for about three minutes, compressed air was introduced at a pressure of about 0.35 atmospheres for about three minutes and the foam poured into large pans for heating first at about 50° C. for 15 minutes and then at about 90° C. for about one hour until dry. The foamed gypsum, which can absorb about 15 times its weight of water is particularly useful at about 1–2 g. per diaper for sorption, especially since it also absorbs the ammoniacal and other odors.

Having illustrated some aspects of the invention by the Examples above, the scope of the protection to be granted by Letters Patent is more fully described in the following claims.

I claim:

1. An open-cell, foamed gypsum absorbent for fluids comprising a carbonaceous material.

2. The absorbent of claim 1, wherein the carbonaceous material is selected from the group consisting of activated carbon, dried blood containing heme, sugar, organic or organometallic chelates, and comminuted vegetable matter containing chlorophyll.

3. The absorbent of claim 1, wherein the carbonaceous material comprises from about 10 percent to about 90 percent of the absorbent.

4. The absorbent of claim 1, wherein the fluid is a gas or vapor selected from the group consisting of carbon monoxide, sulfur dioxide, nitrogen oxide ($NO_x$), ammonia, formaldehyde, carbon dioxide, and tobacco smoke.

5. The absorbent of claim 1, wherein the fluid is a liquid selected from the group consisting of water, salt water, urine, blood, sperm, catemenial fluid, vaginal exudate, pus, and perspiration.

6. The absorbent of claim 1, further comprising aluminum sulfate.

7. The absorbent of claim 6, wherein the aluminum sulfate is from about 0.5 to about 70 weight percent.

8. A diaper comprising the absorbent of claim 1.

9. A diaper comprising the absorbent of claim 6.

10. A hospital or surgical textile comprising an absorbent of claim 1.

11. A hospital or surgical textile comprising an absorbent of claim 6.

12. A sanitary napkin or tampon comprising an absorbent of claim 1.

13. A sanitary napkin or tampon comprising an absorbent of claim 6.

14. A garment for incontinents comprising an absorbent of claim 1.

15. A garment for incontinents comprising an absorbent of claim 6.

16. A face mask comprising the absorbent of claim 1.

17. A face mask comprising the absorbent of claim 6.

18. A cigarette filter comprising the absorbent of claim 1.

19. A cigarette filter comprising the absorbent of claim 6.

20. The absorbent of claim 1, further comprising a polymeric flexibilizing agent.

21. The absorbent of claim 20, wherein the polymeric flexibilizing agent is a water-soluble addition polymer.

22. The absorbent of claim 21, wherein the water-soluble polymer is sodium polyacrylate.

23. The absorbent of claim 1, further comprising a surface-active agent.

24. The absorbent of claim 1, further comprising a polymeric foam hardener.

25. The absorbent of claim 24, wherein the polymeric foam hardener is selected from the group consisting of polyurethane, polystyrene latex, synthetic rubber latex, latices of vinyl addition polymers, polyesters, and polyamides.

26. The absorbent of claim 25, wherein the polymeric foam hardener comprises from about 10 to about 60 weight percent of the foam produced.

27. The absorbent of claim 24, wherein the polymeric foam material is foamed by air, nitrogen, carbon dioxide, or a halocarbon gas.

* * * * *